April 19, 1960

L. J. MALTBY 2,933,270

LANDING GEAR FOR HELICOPTERS

Filed June 4, 1954

INVENTOR.
LEWIS J. MALTBY
BY Lyon & Lyon
ATTORNEYS

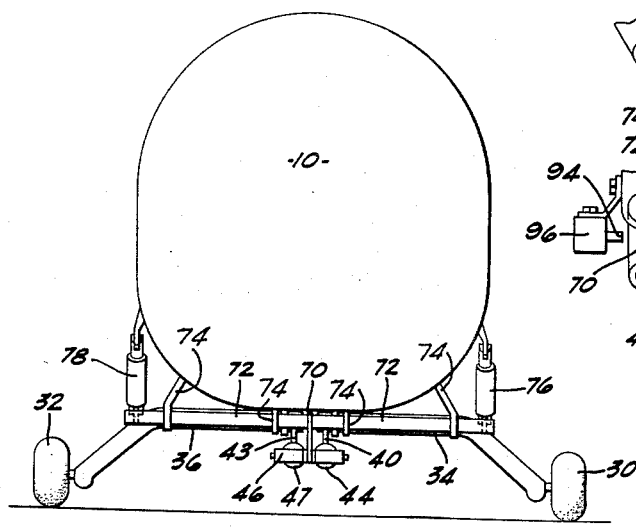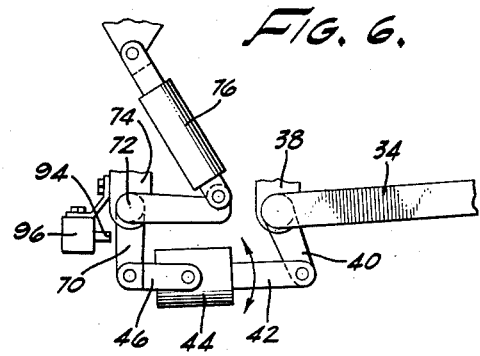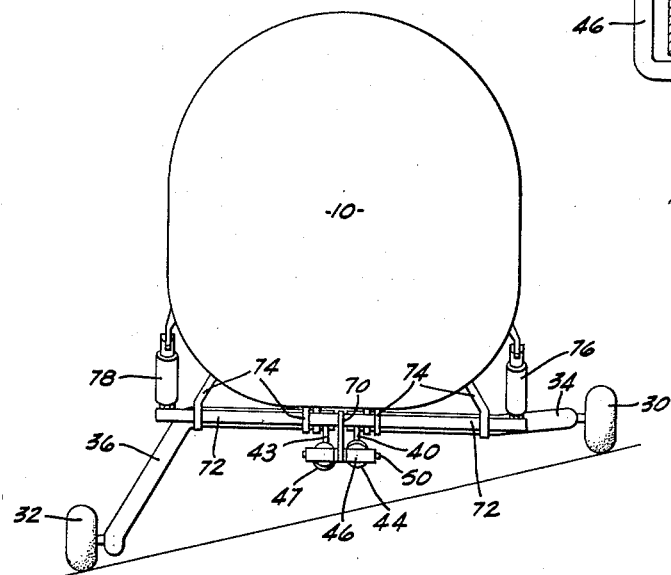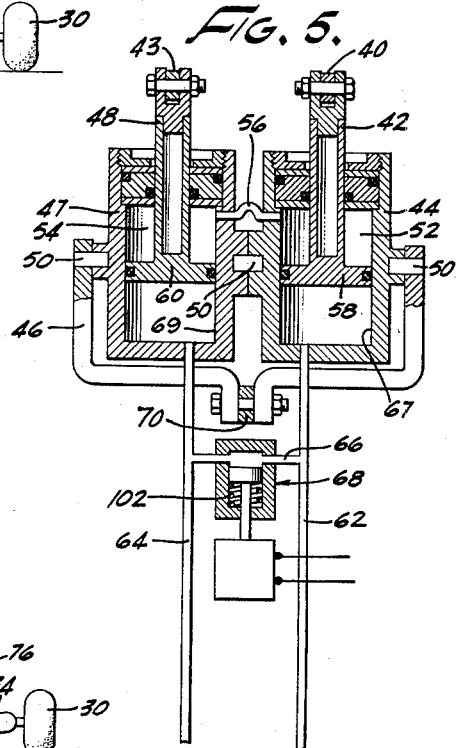

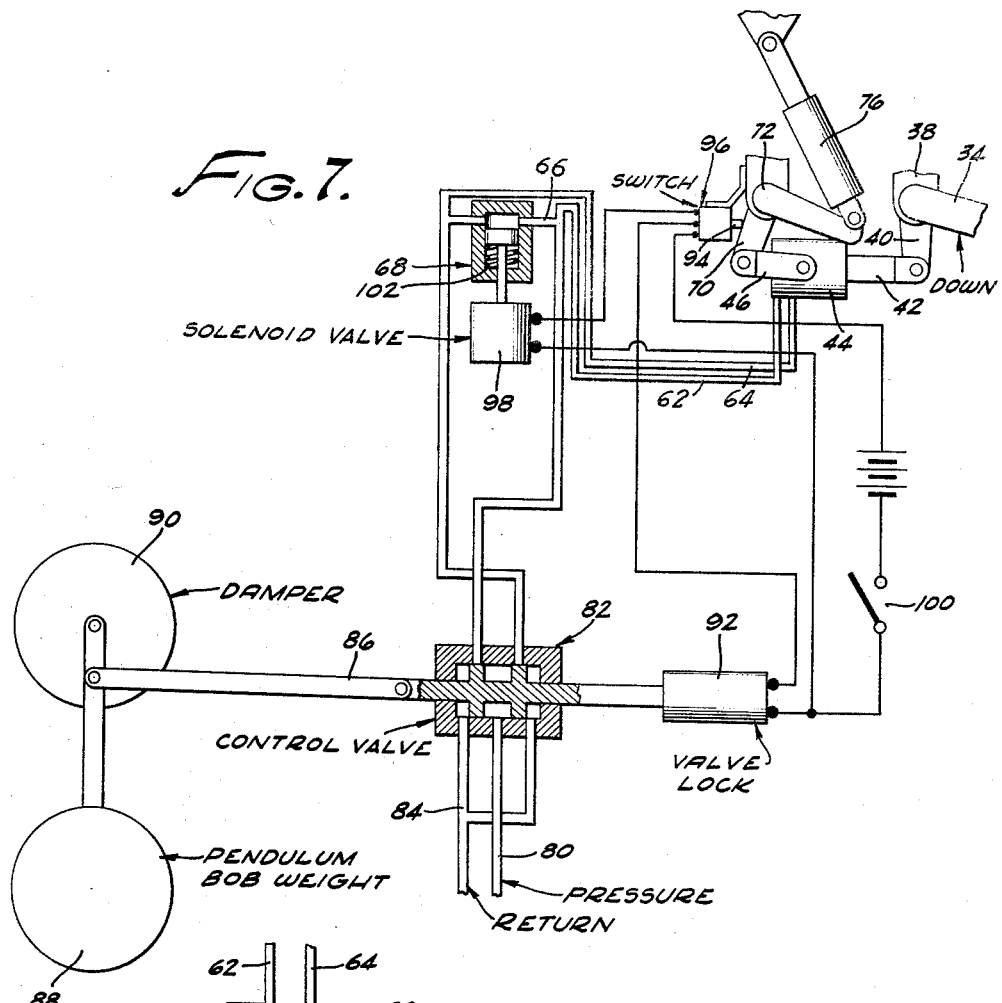
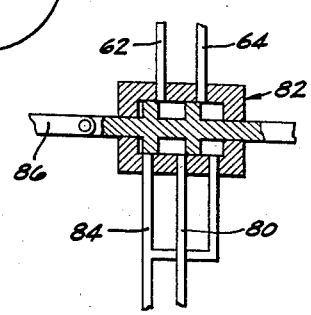

2,933,270
Patented Apr. 19, 1960

2,933,270
LANDING GEAR FOR HELICOPTERS

Lewis J. Maltby, Burbank, Calif., assignor to Menasco Manufacturing Company, Burbank, Calif., a corporation of California Application June 4, 1954, Serial No. 434,588

6 Claims. (Cl. 244—103)

This invention relates to aircraft landing gear and particularly to landing gear of aircraft which are capable of vertical ascent and descent.

In the utilization of helicopters over rough terrain or on a hillside it is the usual practice to hover the aircraft with one wheel slightly touching the ground which requires ideal wind conditions and skillful piloting technique. The utility of helicopters is greatly increased by provision of landing gear adapting same to land on such surfaces.

It is, therefore, an object of this invention to provide landing gear which automatically compensates for the level of the terrain upon which the helicopter is landed.

It is a further object of this invention to maintain an aircraft in a level stable position when landed on an uneven terrain or hillside.

Other objects and advantages will be readily apparent from the following description:

In the drawings:

Figure 3 is a section taken along line 3—3 of Figure 1.

Figure 4 is a view similar to Figure 3 with the helicopter on a hillside.

Figure 5 is a section taken along line 5—5 of Figure 1.

Figure 6 is an enlarged side elevation of the hydraulic cylinders and associated parts.

Figure 7 is a diagrammatic view of the hydraulic control system.

Figure 8 is a sectional view of the control valve.

Figure 1:
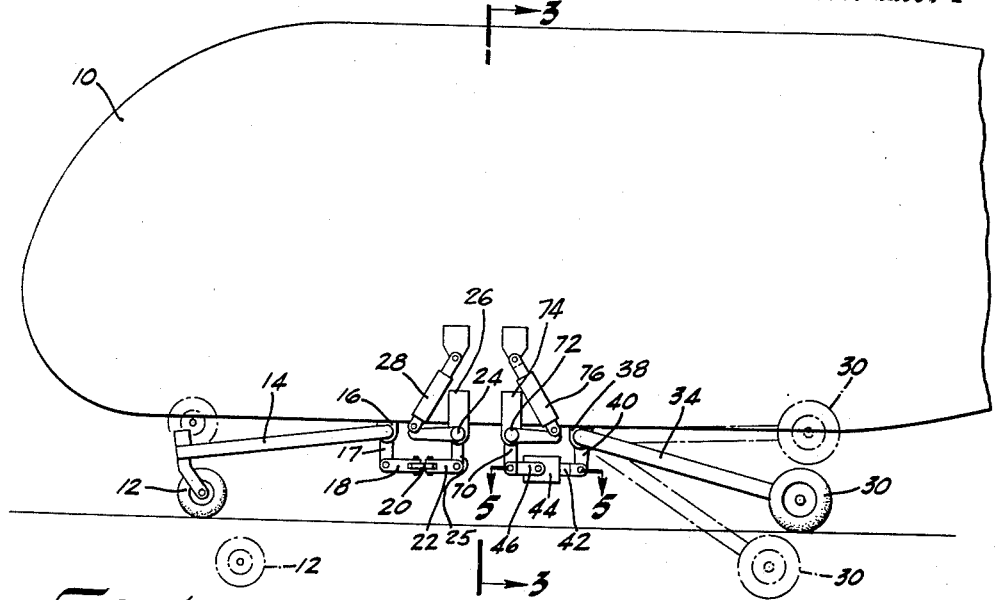
Figure 1 is a partial side elevation of a helicopter with landing gear embodying this invention.
Figure 2:
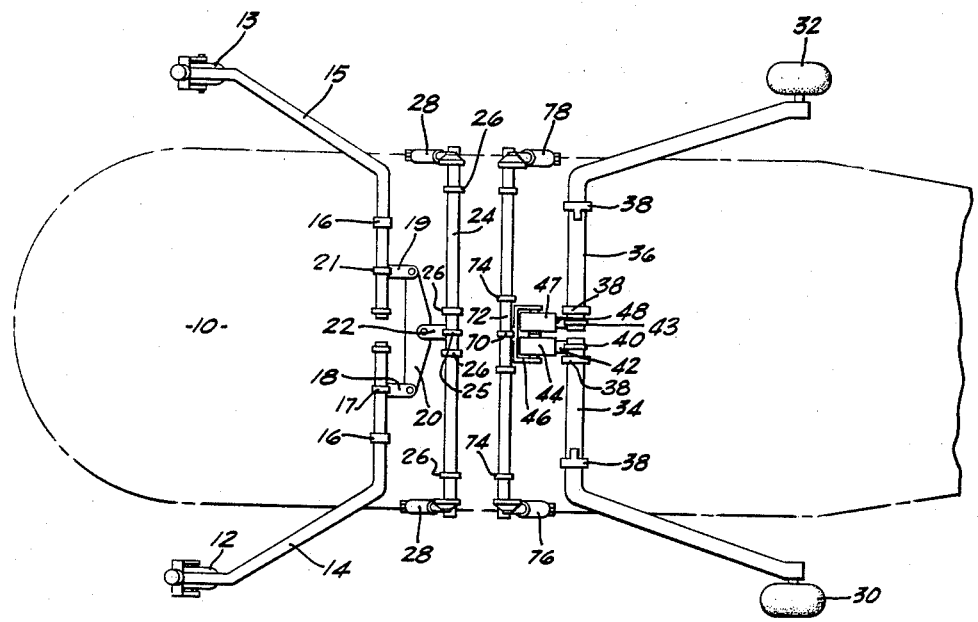
Figure 2 is a top plan of the landing gear mechanism with the fuselage in phantom outline.

Mounted upon the fuselage 10 are a pair of nose wheels 12 and 13, best seen in Figure 2, which are so mounted that when one hits the ground the other will be moved downwardly into contact with same. This mounting is accomplished by mounting the nose wheels on shafts 14 and 15 pivotally supported in bearings 16, in turn secured to fuselage 10. As one of the wheels 12 first strikes the side of a hill it pivots upwardly, as indicated by the dotted positions in Figure 1. This pivoting rotates shaft 14 upon which the wheel is mounted. A link 18 and link 19 are pivotally mounted upon depending levers 17 and 21 which in turn are rigidly mounted to shafts 14 and 15. Links 18 and 19 are pivotally attached to connecting lever 20. As shaft 14 is rotated the lever 17 swings to pull the link 18 forward or rearward, depending upon the direction of rotation of shaft 14 and pivots lever 20 which in turn exerts a pull on link 19, which swings lever 21 which rotates shafts 15 and lowers wheel 13 into contact with the ground. Lever 20 is pivotally connected by link 22 to a lever 25 rigidly attached to shaft 24, rotatably mounted in bearings 26 secured to fuselage 10. At each extremity of shaft 24 a shock absorber 28 is suitably connected. These shock absorbers may be of any suitable type well known to those skilled in the art and are attached at their opposite extremities to fuselage 10, absorbing shock transmitted through nose wheels 12 and 13.

The main landing gear is mounted upon the fuselage in such a manner that when one wheel strikes the ground the other will be lowered into contact therewith. However, to avoid ground resonance the wheels are interconnected so that when both are under load and one is deflected upwardly the opposite wheel will move upwardly also. This connection is formed by mounting wheels 30 and 32 on separate shafts or axles 34 and 36, which are rotatably mounted in bearings 38 secured to fuselage 10.

As the helicopter lands assuming wheel 30 strikes the ground first, shaft 34 is rotated. This shaft has attached to its extremity a link 40 which is secured to piston rod 42 of actuator 44. The actuator 44 is mounted in yoke 46 in side by side relationship with actuator 47 whose piston rod 48 is pivotally attached to link 43 rigidly attached to the inner extremity of shaft 36. The actuators are retained in position by trunnion pinions 50 and are each provided with a chamber 52 and 54 filled with a suitable fluid and connected by a conduit 56. A suitable fluid under pressure is supplied to power control chambers 67 and 69 through conduits 62 and 64 from a source not shown. The conduits 62 and 64 are communicated through conduit 66 which has a solenoid controlled valve 68 therein.

When the helicopter first lands on an uneven surface, assuming wheel 30 strikes first, the piston 58 is forced against fluid in chamber 52, said fluid moving through conduit 56 to chamber 54 and forcing piston 60 to retract farther into its cylinder. Fluid displaced from chamber 69 by piston 60 moves through conduits 64, 66 and 62 into chamber 67. Retraction of piston 60 and attached piston rod 48 rotates shaft 36 and lowers wheel 32. When wheel 32 engages the ground the solenoid valve 68 is closed locking the actuators 44 and 47 so that the wheels are interconnected and if one wheel is raised the other will also raise as a unit because the hydraulic fluid in the unit is trapped and prevents movement of shafts 34 and 36. The valve 82 will also be closed when this condition arises. Opening of the valve 82 would unlock the shafts 34 and 36 and allow them to move independently. Both valves 68 and 82 must be closed to lock shafts 34 and 36 together.

The closing of the solenoid valve 68 is effected through yoke 46 which is connected through link 70 to shaft 72 rotatably supported on the fuselage 10 by bearing 74. At each extremity shaft 72 is connected to one end of a shock absorber 76 and shock absorber 78, which shock absorbers have their other extremities connected to fuselage 10. The shock absorbers being of any suitable type well known to those skilled in the art. Thus when both wheels have made contact with the ground, the helicopter fuselage will continue to descend and shafts 34 and 36 rotate in a manner which pulls actuators 44 and 47, which in turn pull link 70, which moves away from contact pin 94 of switch 96, thereby allowing switch 96 to open and de-energize solenoid 98.

Since the helicopter landing gear described is inherently unstable as it is supported below its center of gravity, this necessitates a hydraulic control system to right the fuselage with respect to the landing gear. Such a system is illustrated in Figures 7 and 8.

Fluid under pressure is supplied from the helicopter's hydraulic system through conduit 80 to the control valve 82 to conduits 62 or 64 depending upon the positioning of valve 82 and is returned through conduit 84.

Valve 82 is positioned by means of valve stem 86, which in turn is positioned by pendulum 88 while damper 90 limits oscillation of the valve stem. During flight the valve stem is held in the position indicated in Figure 7 by valve lock 92, blocking off flow from conduits 80 and 84 to conduits 62 and 64. Upon the landing gear engaging the ground the solenoid controlled valve lock 92 is released permitting pendulum 88 to take charge. In flight with the wheels level the shaft 34 is in the lower position which urges link 70 into contact with pin 94 of switch 96 closing two switches completing the circuit and energizing solenoid 98 opening valve 68 and communicating conduits 62 and 64 through conduit 66 and a circuit energizing the valve lock 92 to hold the valve stem in the position illustrated in Figure 7 when pilot switch 100 is closed.

Upon the wheels 30 and 32 engaging the ground shaft 34 is rotated upwardly moving link 70 to the right in Figure 7. This moves the link out of contact with pin 94 and opens the switches. Thus solenoid 98 is deenergized so that spring 102 closes valve 68 blocking conduit 66. Also the solenoid controlled valve lock 92 is deenergized permitting pendulum 88 to position valve stem 86. The position of the valve stem is dependent upon the relative positions of wheels 30 and 32, an example being shown in Figure 8 where fluid under pressure is delivered to conduit 62, while fluid returns from conduit 64 to conduit 84, whereby the helicopter is righted.

While what hereinbefore has been described is the preferred embodiment of this invention it is readily apparent that modifications and alterations can be resorted to without departing from the scope of this invention and such alterations and modifications are intended to be within the scope of the appended claims.

I claim:

1. In a vertical ascending and descending aircraft the combination of: a pair of axles, means pivotally mounting said axles independently of one another to said aircraft, a piston attached to each axle, a cylinder receiving each piston, means communicating the cylinders on each side of each piston whereby pivoting of one axle results in equal and opposite pivoting of the remaining axle, a movable yoke carrying both cylinders, a shaft rotatably mounted upon said aircraft responsive to movement of said yoke, and means responsive to rotation of said shaft for interrupting communication of said cylinders on one side of said pistons.

2. In a vertical ascending and descending aircraft the combination of: a pair of axles, means pivotally mounting said axles independently of one another to said aircraft, a piston attached to each axles, a cylinder receiving each piston, means communicating the cylinders on each side of each piston whereby pivoting of one axle results in equal and opposite pivoting of the remaining axle, a movable yoke carrying both cylinders, a shaft rotatably mounted upon said aircraft responsive to movement of said yoke, and shock absorbers connecting said shaft to said aircraft responsive to rotation of said shaft to interrupt communication of said cylinders on one side of said pistons.

3. In a vertical ascending and descending aircraft the combination of: a pair of wheels, means pivotally suspending said wheels from said aircraft said means operating so that if one of said wheels engages the ground before the other said wheel will pivot upwardly while lowering the other wheel into contact with the ground, and means interconnecting said wheels pivoting same as a unit when both are in contact with the ground, a pair of nose wheels in advance of said first mentioned pair of wheels, and means mounting said nose wheels to said aircraft said means operating so that pivoting of one wheel produces equal pivoting in the opposite direction for the other of said nose wheels.

4. In a vertical ascending and descending aircraft the combination of: a pair of axles, means pivotally mounting said axles independently of one another to said aircraft, an actuator connected to each axle, means communicating said actuators so that pivoting of one axle is communicated through said actuators to pivot the remaining axle an equal amount in the opposite direction, means for terminating the communication between said actuators when both axles are under a load in the same direction, a pair of nose wheels in advance of said first mentioned pair of axles, and means mounting said nose wheels to said aircraft said mounting means operating so that pivoting of one wheel produces equal pivoting in the opposite direction for the other of said nose wheels.

5. In a vertical ascending and descending aircraft the combination of: a pair of axles, means pivotally mounting said axles independently of one another to said aircraft, a piston attached to each axle, a cylinder receiving each piston, means communicating the cylinders on each side of each piston, said communicating means operating so that pivoting of one axle results in equal and opposite pivoting of the remaining axle, a movable yoke carrying both cylinders, a shaft rotatably mounted upon said fuselage responsive to movement of said yoke, means responsive to rotation of said shaft for interrupting communication of said cylinders on one side of said pistons, a pair of nose wheels in advance of said first mentioned pair of axles, and means mounting said nose wheels to said aircraft said mounting means operating so that pivoting of one wheel produces equal pivoting in the opposite direction for the other of said nose wheels.

6. In a vertical ascending and descending aircraft the combination of: a pair of axles, means pivotally mounting said axles independently of one another to said aircraft, a piston attached to each axle, a cylinder receiving each piston, means communicating the cylinders on each side of each piston whereby pivoting of one axle results in equal and opposite pivoting of the remaining axle, a movable yoke carrying both cylinders, a shaft rotatably mounted upon said aircraft responsive to movement of said yoke, and shock absorbers connecting said shaft to said aircraft, means responsive to rotation of said shaft to interrupt communication of said cylinders on one side of said pistons, a pair of nose wheels in advance of said first mentioned pair of axles, and means mounting said nose wheels to said aircraft said mounting means operating so that pivoting of one wheel produces equal pivoting in the opposite direction for the other of said nose wheels.

References Cited in the file of this patent

UNITED STATES PATENTS

| | | |
|---|---|---|
| 2,100,445 | Le Bleu | Nov. 30, 1937 |
| 2,316,682 | Finnegan | Apr. 13, 1943 |
| 2,347,959 | Moore | May 2, 1944 |
| 2,520,266 | Adams | Aug. 29, 1950 |
| 2,599,690 | Buivid et al. | June 10, 1952 |
| 2,630,989 | Sikorsky | Mar. 10, 1953 |

FOREIGN PATENTS

| | | |
|---|---|---|
| 544,493 | Great Britain | Apr. 5, 1942 |
| 618,914 | Great Britain | Mar. 1, 1949 |
| 818,734 | Germany | Oct. 29, 1951 |
| 819,026 | France | June 28, 1937 |
| 829,039 | France | Mar. 7, 1938 |